United States Patent
Juniel

(10) Patent No.: US 10,176,075 B1
(45) Date of Patent: Jan. 8, 2019

(54) METHODS, SYSTEMS, AND COMPUTER READABLE MEDIUMS FOR GENERATING KEY PERFORMANCE INDICATOR METRIC TEST DATA

(71) Applicant: VCE IP Holding Company LLC, Richardson, TX (US)

(72) Inventor: Jared D. Juniel, Sachse, TX (US)

(73) Assignee: VCE IP HOLDING COMPANY LLC, Richardson, TX (US)

(*) Notice: Subject to any disclaimer, the term of this patent is extended or adjusted under 35 U.S.C. 154(b) by 81 days.

(21) Appl. No.: 15/348,242

(22) Filed: Nov. 10, 2016

(51) Int. Cl.
G06F 11/36 (2006.01)

(52) U.S. Cl.
CPC ...... *G06F 11/3616* (2013.01); *G06F 11/3664* (2013.01); *G06F 11/3684* (2013.01)

(58) Field of Classification Search
CPC ............. G06F 11/3672; G06F 11/0709; G06F 11/3409; G06F 11/3452; G06F 11/3495; G06F 11/3688; G06F 11/3664
See application file for complete search history.

(56) References Cited

U.S. PATENT DOCUMENTS

| | | | |
|---|---|---|---|
| 7,412,349 B2* | 8/2008 | Moser | G06F 11/3688 702/182 |
| 7,617,201 B1 | 11/2009 | Bedell et al. | |
| 8,065,410 B1 | 11/2011 | Breen et al. | |
| 9,130,860 B1 | 9/2015 | Boe et al. | |
| 9,275,374 B1 | 3/2016 | Mendis et al. | |
| 9,619,531 B2* | 4/2017 | Wu | G06F 17/30554 |
| 2003/0110007 A1* | 6/2003 | McGee | G06F 11/0709 702/179 |
| 2011/0184893 A1 | 7/2011 | Paparizos et al. | |
| 2013/0318236 A1 | 11/2013 | Coates et al. | |
| 2014/0181087 A1* | 6/2014 | Wu | G06F 3/04842 707/722 |
| 2015/0146547 A1* | 5/2015 | Kapnadak | H04W 24/04 370/252 |
| 2016/0034379 A1* | 2/2016 | Shah | G06F 11/3664 707/602 |
| 2018/0018680 A1* | 1/2018 | Bs | G06Q 30/0201 |

OTHER PUBLICATIONS

"Part 11: Wireless LAN Medium Access Control (MAC) and Physical Layer (PHY) Specifications; Amendment 4: Enhancements for Very High Throughput for Operation in Bands Below 6 Ghz," IEEE Computer Society, IEEE Std 802.11ac pp. 1-395 (2013).

(Continued)

*Primary Examiner* — Nadeem Iqbal
(74) *Attorney, Agent, or Firm* — Jenkins, Wilson, Taylor & Hunt P.A.

(57) ABSTRACT

Methods, systems, and computer readable mediums for generating key performance indicator (KPI) metric test data are disclosed. According to one method, the method includes receiving KPI parameter data associated with a KPI metric corresponding to a system element hosted by a computing system, generating KPI metric test data values for the KPI metric in accordance to a defined time period and a collection frequency interval specified by the KPI parameter data, and utilizing the KPI metric test data values to subject at least one of an interface layer or service logic of the computing system to a validation assessment.

18 Claims, 3 Drawing Sheets

(56) References Cited

OTHER PUBLICATIONS

"IEEE Standard for Ethernet," IEEE Computer Society, IEEE Std 802.3, pp. 1-580 (Dec. 28, 2012).
Final Office Action for U.S. Appl. No. 14/631,218 (dated Mar. 21, 2018).
Non-Final Office Action for U.S. Appl. No. 14/631,218 (dated Aug. 25, 2017).
Commonly-assigned, co-pending U.S. Appl. No. 14/631,218 for "Methods, Systems and Computer Readable Mediums for Sharing User Activity Data," (Unpublished, filed Feb. 25, 2015).
Advisory Action for U.S. Appl. No. 14/631,218 (dated May 24, 2018).
Non-Final Office Action for U.S. Appl. No. 14/631,218 (dated Jun. 29, 2018).

\* cited by examiner

METHODS, SYSTEMS, AND COMPUTER READABLE MEDIUMS FOR GENERATING KEY PERFORMANCE INDICATOR METRIC TEST DATA

TECHNICAL FIELD

The subject matter described herein relates to generating test data for computing systems. More specifically, the subject matter relates to methods, systems, and computer readable mediums for generating key performance indicator (KPI) metric test data.

BACKGROUND

In many computing system environments, the resident computing system management software allows for various performance measurements to be collected from different components utilized by the host computing system. These performance measurements are also known as key performance indicators (KPIs), which are typically captured over a period of time. In order to test or validate interface layers or services that utilize (e.g., aggregate, report and/or display) these measurements, the computing system is typically required to run for the aforementioned period of time in order for the actual KPI measurements to be generated and collected. For example, if an interface layer or system logic of the computing system is to be monitored for a week, then seven days will need to pass for the necessary data to be collected. While computing systems may be configured to allow for shorter periods of time to elapse (e.g., the data may be collected over a short period of time and subsequently copied in order to represent a larger time period), those computing systems still require at least some time to pass in order to generate realistic KPI measurement data.

SUMMARY

In accordance with this disclosure, methods, systems, and computer readable mediums for generating key performance indicator (KPI) metric test data are disclosed. According to one embodiment, the method includes receiving KPI parameter data associated with a KPI metric corresponding to a system element hosted by a computing system, generating KPI metric test data values for the KPI metric in accordance to a defined time period and a collection frequency interval specified by the KPI parameter data, and utilizing the KPI metric test data values to subject at least one of an interface layer or service logic of the computing system to a validation assessment.

BRIEF DESCRIPTION OF THE DRAWINGS

The subject matter described herein will now be explained with reference to the accompanying drawings of which.

DETAILED DESCRIPTION

Figure 1:
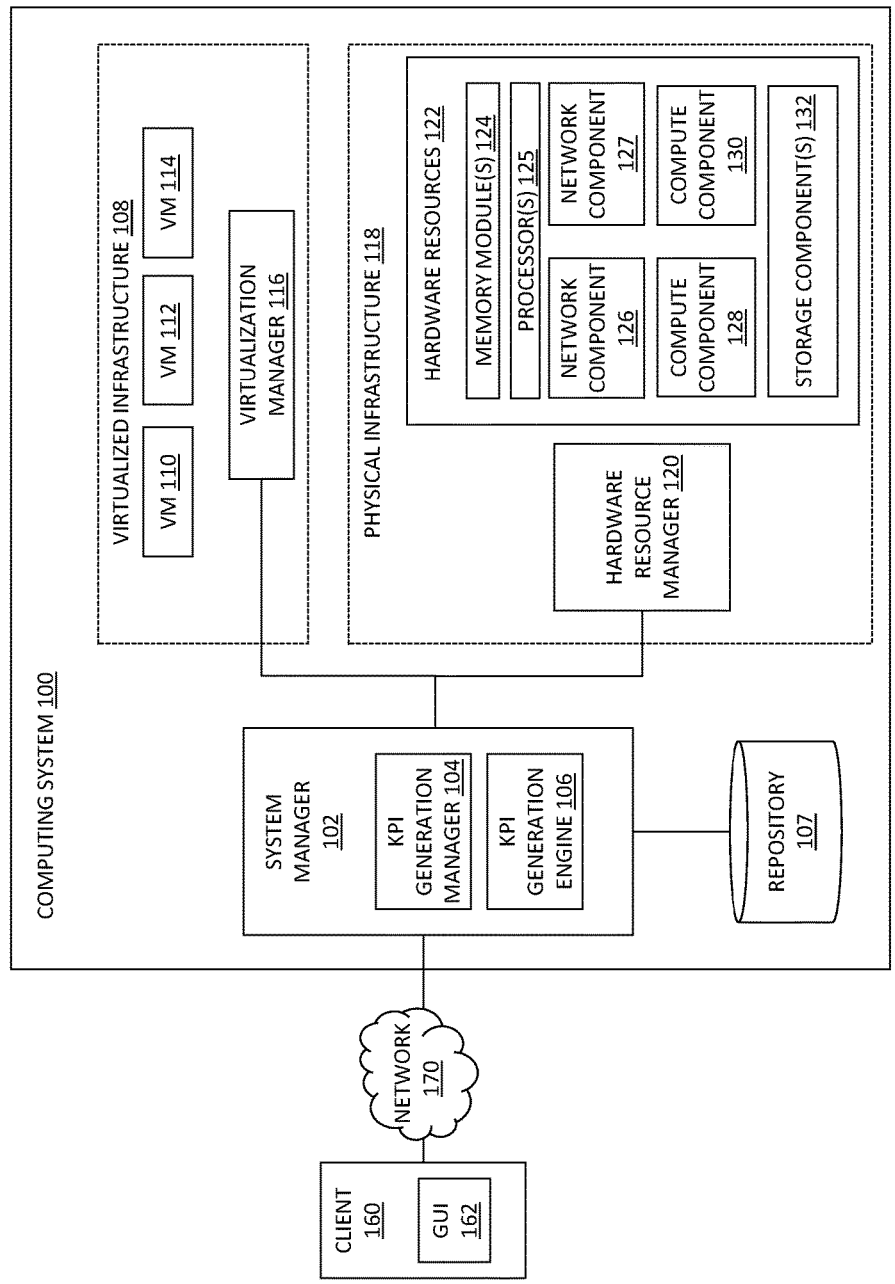
FIG. 1 is a block diagram illustrating an exemplary computing system for generating KPI metric test data in accordance to embodiments of the subject matter disclosed herein.

The subject matter described herein discloses methods, systems, and computer readable mediums for generating KPI metric test data. As disclosed herein, computing system management software allows for various KPI metrics to be collected from different components and/or elements included within the host computing system. In order to test the presentation of the KPI metrics, the computing system typically needs to operate for a period of time in order for the actual KPI measurements to be collected. In an attempt to eliminate unnecessary time, the disclosed subject matter provides a system for generating KPI metric test data, such that an interface layer (e.g., a presentation layer or application programming interface (API)) or service of the computing system can be promptly tested without any additional time to collect KPI measurement data actually generated by the computing system components. As indicated above, in order to properly generate actual KPI metric data, a given amount of time must pass so that KPI measurement data can be generated and subsequently collected by the computing system for that given time interval. In scenarios where the KPI metric data values do not particularly matter (e.g., validation assessments such as subjecting a GUI to a performance test or validating a service of the computing system), this collection period significantly increases the time required by the system manager to conduct validation assessments, such as performance tests. As such, the disclosed subject matter affords a number of technological advantages over previous methods of KPI data generation and/or generation. Notably, the system effectively eliminates the need for any time to pass before generating the KPI metric test data and gives complete control over the time period, collection frequency, and boundary conditions in which the KPI metric data is to be generated. Further, the disclosed subject matter allows for formulaic generation of data, which is limited with previous data generation approaches, which may randomize data, or repeat a fixed set of values.

Although the subject matter can be used to generate KPIs as described for the examples herein, other software entities associated with a computing system or network may also be implemented without departing from the scope of the disclosed subject matter. In accordance with some aspects of the disclosed subject matter, methods, systems, algorithms, and/or techniques are disclosed for generating KPI metric test data. For example, a computing system can include one or more computing platforms comprising one or more computing system components (CSCs), such as compute components, software components, network components, switching components, storage components, hardware components, firmware components, and/or other elements. In some embodiments, an exemplary computing system for generating KPI metric test data can comprise any computing system and/or device that utilizes one or more processors and memory, such as an integrated infrastructure (which may include a plurality of compute components, each of which includes one or more processors and memory). One exemplary integrated infrastructure is a converged infrastructure system (CIS), such as, for example, a Vblock™ System from VCE Company, LLC. A CIS can comprise multiple CSCs (e.g., components, physical resources and/or virtual resources) in a preconfigured or prepackaged computing platform, where some CSCs are developed and/or manufactured by multiple entities. For example, an exemplary CIS can comprise data storage devices, servers, network equipment, and software for managing physical resources and/or virtualized resources (e.g., virtual servers). Any computing system, CIS, integrated infrastructure system, or device may be utilized without departing from the scope of the present subject matter.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary computing system (CS) 100 according to an embodiment of the subject matter described herein. Although the following disclosure describes the use of CS 100, any type of computer system, such as a converged infrastructure system, may be utilized without departing from the scope of the present subject matter. As shown in FIG. 1, CS 100 can comprise CSCs, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CSs), a virtual machine, a virtual server, a virtual storage device, a virtual port, and/or a virtual communications interface. CS 100 may also comprise software and related components for managing the CS and/or portions (e.g., CSCs) therein.

In some embodiments, CS 100 may be configured to communicate with various other entities, such as network nodes (e.g., servers hosting online sites) and users. For example, client 160 may represent any entity (e.g., software executing on a processor, a web-based interface, etc.) for allowing a user entity (e.g., a human operator or an automated system) to interact with CS 100, CSCs therein, and/or other entities. In some embodiments, client 160 may include a graphical user interface (GUI) that may be used by a human operator to provide input (e.g., KPI parameter data) to and receive output from CS 100 via network 170. In other embodiments, client 160 may be a component integrated within CS 100 and/or may establish communication directly with CS 100 without using network 170.

In some embodiments, CS 100 can comprise a computing system (CS) manager 102 (e.g., a computing system management module), a repository 107, virtualized infrastructure 108, and/or physical infrastructure 118. System manager 102 may be any suitable entity for managing aspects of CS 100 or portions therein (e.g., CSCs or groups of CSCs). System manager 102 may be configured to communicate with various CSCs and/or for managing various CSCs. For example, system manager 102 can be configured to access each CSC within CS 100 and return relevant information to client 160. For example, system manager 102 may be configured to manage performance, resource utilization levels, and other aspects associated with virtualized infrastructure 108 and/or physical infrastructure 118. In some embodiments, System manager 102 can comprise VCE Vision™ Intelligent Operations software and/or firmware.

In some embodiments, system manager 102 can interact with CSCs (e.g., virtual and physical resources) in CS 100. In some embodiments, system manager 102 may be configured to receive, relay, route or forward identification information requests (e.g., Ethernet frames or packets) to one or more CSCs or other entities (e.g., client 160). In this example, CS manager 102 and/or other CSCs associated with CS 100 can include one or more communications interfaces, such as an Institute of Electrical and Electronics Engineers (IEEE) 802.3 Ethernet interface, an IEEE 802.11 wireless interface, an application programming interface (API), and/or other interfaces.

As indicated above, system manager 102 includes KPI generation manager 104. In some examples, KPI generation manager 104 may comprise a software module that when executed by a hardware processor performs a number of management functions for computing system 100. For example, KPI generation manager 104 may be configured to receive KPI parameter data as input from a user (e.g., via client 160). The received KPI perimeter data may include a KPI name (e.g., a KPI key), a KPI time period (e.g., a duration specified by a start time and an end time), a KPI collection frequency, KPI data boundary conditions (e.g., a minimum KPI metric test data value and/or a maximum KPI metric test data value), and the like. For example, the KPI parameter data may include predefined KPI data ranges defined maximum and minimum numeric boundaries that will restrict the upper and lower bounds of the KPI metric data values that are ultimately generated. Notably, the predefined KPI data ranges enables a user to control the KPI metric data values that are generated for any number of reasons, such as, providing a realistic data value that is commonly generated in a real world environment (e.g., not an extreme outlier value) or that match data value patterns that are seen in a customer deployment environment.

In some embodiments, KPI generation manager 104 may be configured to receive (as input from client 160) a predefined formula or algorithm for generating KPI metric test data values. Notably, the KPI formula may ultimately be used by KPI generation engine 106 to generate KPI metric data values for a particular computing system component or element. Alternatively, a "KPI seed file" may be provided to KPI generation manager 104 as input from client 160. The KPI seed file may include a collection of real data values (e.g., model KPI metric test data values) that can be used by KPI generation manager 104 to derive and generate a KPI formula. For example, KPI generation manager 104 may be configured to apply the model KPI data values in the seed file to a best-fit algorithm, which produces a best-fit KPI formula configured to receive KPI parameter data as input variables. Notably, the derived formula would constitute an actual estimation of an algorithm that produces the KPI data values included in the seed file (as opposed to a simple cyclical repeating of copied data values).

As shown in FIG. 1, system manager 102 also includes KPI generation engine 106. In some examples, KPI generation engine 106 comprises a software module that may be executed by a hardware processor of computing system 100. Notably, KPI generation engine 106 may be configured to receive KPI parameter data and other information from KPI generation manager 104 to produce KPI metric test data values. For example, KPI generation manager 104 may communicate the KPI name (or key), the unique identification parameters of the computing system component (e.g., equipment device or virtual machine) that the KPI metric test data is associated (e.g., appears to originate from), a predefined time period, and the collection frequency (e.g., a period of time between the supposed collection of KPI metric test values) to KPI generation engine 106. In addition, KPI generation manager 104 may provide a formula or algorithm to KPI generation engine 106. Upon receiving the formula and the KPI parameter data from KPI generation manager 104, KPI generation engine 106 may initiate the generation process of the KPI metric test data. For example, KPI generation engine 106 may utilize the predefined time period (e.g., starting time and ending time), the collection frequency, and maximum and minimum boundary values as inputs for the received KPI formula. Specifically, KPI generation engine 106 may be configured to execute the KPI formula and generate KPI metric test data values that give the appearance that they were collected from a specified computing system component or element over the predefined time period, at the specified collection frequency, and in accordance to the specified boundary value limit(s).

As an example, KPI generation manager 104 may send KPI parameter data corresponding to the KPI entitled "MemoryUtilized" (or a KPI key) that is associated with an identified compute component device. In particular, the KPI parameter data may specify boundary limits including a maximum limit of 32 MB of RAM consumed and a minimum limit of 0 MB of RAM consumed. The KPI parameter data may also include a collection frequency of 30 seconds and the time period defined as a period of one week. In some examples, the specified time period may be defined by starting time and an ending time (e.g., a starting time of 2:00 pm on January 11$^{th}$ and an ending time of 2:00 pm on January 18$^{th}$). Further, KPI generation manager 104 may also send a formula or algorithm that is configured to generate KPI metric test data values for memory utilization by a specified compute component upon receiving one or more input parameters corresponding to one or more the aforementioned boundary limits, collection frequency value, a specified time period value, and the like.

In another example, KPI generation manager 104 may send KPI parameter data corresponding to a KPI entitled "Voltage" that corresponds to an identified compute component device, such as a processor. The KPI parameter data may specify a formula of $y=100 \sin(x/100)+100$. This example formula would, by definition, enforce an upper bound of 200, and a lower bound of 0. The KPI parameter data would also indicate that the unit of the measurements is in Watts. The collection frequency may be defined as one second and the time period defined as two days.

After executing the formula and/or algorithm to generate the KPI metric test data values, KPI generation engine 106 forwards the generated data to KPI generation manager 104. KPI generation manager 104 may then configure the received KPI metric test data in any one of the plurality of ways. For example, KPI generation manager 104 may roll-up the KPI metric test data if the test data was generated for multiple computing system components (e.g., generated KPI metric data is associated with a single KPI metric "type" for each of a plurality of computing system components). Similarly, KPI generation manager 104 may aggregate the received KPI metric test data associated with multiple system components in order to provide a representative value (e.g., an average value) for the host computing system for a given time period (e.g., a day, year, etc.).

Once the KPI metric test data is processed by KPI generation manager 104, KPI generation manager 104 may send that KPI metric test data to a storage location, such as repository 107 or some other local or external database, which is accessible by system manager 102. Once the KPI metric test data is stored in repository 107, system manager 102 may be provided with address information that is used to query repository 107 for purposes of accessing and obtaining the stored data. System manager 102 may subsequently utilize the KPI metric test data to conduct a validation assessment (e.g., a simulated performance test, a service validation, etc.) for one or more interface layers of computing system 100. For example, system manager 102 may use the KPI metric test data to test the presentation layer of system 100. Specifically, system manager 102 may apply the KPI metric test data to conduct software testing that utilizes the data required by a GUI to display visual information, such as a graph, table, chart, and/or other plots. Notably, this graphical display simulation enables a user to determine if the presentation layer is capable of properly displaying realistic KPI metric data (i.e., both KPI metric test data and real KPI metric test data) via a GUI associated with system 100. For example, the user may determine if the GUI displays the proper appearance and/or scale of the KPI metric test data. Additionally, the KPI metric test data may be used by system manager 102 to subject one or more APIs to a performance test at a messaging layer (e.g., assess satisfactory functionality, reliability performance and security).

In some examples, the validation assessment may comprising system manager 102 validating one or more of service logic components or modules supported by computing system 100. For example, system manager 102 may utilize the KPI metric test data to validate the resident aggregation logic utilized by system manager 102 to collect and subsequently aggregate daily KPI metric values into an aggregated monthly KPI value. Other examples of interfaces and services that may be validated by system manager 102 include APIs that transform KPI metric values from one form to another, e.g. to convert numeric values into string values.

Notably, the aforementioned validation assessment of the presentation layer to properly display KPI metric data or the messaging layer to communicate via APIs corresponding to a particular time period (e.g., one month) may be conducted without having to wait for the tested time period to actually elapse in real-time (i.e., wait one month for the actual data collection). In other embodiments, the validation of assessment may include processes other than performance tests. For example, the validation assessment may include a process executed by system manager 102 that attempts to validate the proper handling of KPI metric test data by any interface layer.

In some embodiments, KPI generation manager 104 may store, utilize, and/or access data in repository 107. Repository 107 can include any data storage unit (e.g., a database or a plurality of databases) that is accessible by system manager 102 and can be configured to store KPI related information, such as actual KPI metric data or KPI metric test data. Although FIG. 1 depicts repository 107 as a local data storage unit residing on CS 100, repository 107 can also be embodied as a data storage unit located at an online location (e.g., a public distributed content site), on a local proxy server in a customer's or system administrator's environment, or on a different CS without departing from the scope of the disclosed subject matter. Further, repository 107 can be implemented using one or more computing platforms, devices, or systems.

Virtualized infrastructure 108 can comprise a virtualization environment configured to simulate components of a computing device, e.g., a processor, system memory, and a storage device, for executing one or more virtual machines (VMs) (e.g., VM 110, VM 112, and VM 114). Each of VM 110, VM 112, and VM 114 may be configured to perform various functions and/or services, such as web server functions or cloud application services, and may interact with various nodes, components, and/or users.

In some embodiments, virtualized infrastructure 108 can be associated with one or more virtual entities. Each virtual entity can comprise one or more CS or portions therein, e.g., CSCs from one or more CSs. In some embodiments, virtualization manager 116 may allow logical entities to be created, deleted, or modified using an API and/or a graphical user interface (GUI). Virtualization manager 116 may be any suitable entity (e.g., software executing in a virtual machine) for managing aspects associated with virtualized infrastructure 108. In some embodiments, virtualization manager 116 may be configured to provide data center management through one or more communications interfaces. For example, virtualization manager 116 may communicate with one or more third-party management tools using APIs.

Physical infrastructure 118 can comprise hardware resources 122, such as memory module(s) 124, processor(s) 125, network components 126-127, compute components 128-130, and one or more storage component(s) 132 (e.g., a storage area network). Hardware resources 122 may be communicatively connected to various other CSCs in CS 100 and other entities. Hardware resources 122 can be configured for use by one or more virtual entities. In some embodiments, network components 126-127 (e.g., network switches) may be configured to enable communication between the components in CS 100. In some embodiments, one or more file share storage (FSS) systems (not shown) can be utilized to provide file system level access to a CS across a local area network (LAN).

Hardware resource manager 120 can be any suitable entity (e.g., software executing in a virtual machine) for managing aspects associated with physical infrastructure 118. In some embodiments, hardware resource manager 120 may be configured to provision hardware resources 122 via one or more communications interfaces. For example, hardware resource manager 120 may provision hardware resources 122 for implementing one or more virtual entities in virtualized infrastructure 108. In some embodiments, hardware resource manager 120 may comprise any management component or entity, such as a unified infrastructure manager (UIM) or a unified computing system (UCS) director entity, which is configured to provision the physical hardware of CS 100.

In some embodiments, processor(s) 125 can include a microprocessor (e.g., a trusted platform module (TPM) using trusted execution technology (TXT)), central processing unit (CPU), or any other like hardware based processing unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of aspects of the disclosed subject matter. In some embodiments, storage component(s) 132 can include any storage medium or storage unit that is configured to store data accessible by processor(s) 125 via a system bus. In some embodiments, repository 107 or portions thereof may utilize storage component(s) 132 and/or memory module(s) 124. In some embodiments, repository 107 and/or storage component(s) 132 can include or utilize one or more storage area networks.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions, which when executed by a processor of a computer, cause the computer to perform steps. Exemplary non-transitory computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, a repository 107 (e.g., a system library or data therein) may be located at a single computing system or may be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 may be incorporated or implemented using one or more other entities depicted in FIG. 1. For example, functionality associated with KPI generation manager 104 or KPI generation engine 106 may be performed or implemented using one or modules or components. In some embodiments, KPI generation manager 104 and/or KPI generation engine 106 may be implemented in a programming language, (e.g. Java or Python). In particular, each of components 104 and 106 may comprise a collection of executable programs (e.g. Java classes or Python scripts) that provide the requisite functionality to receive input from a user, e.g., via client entity 160. The programs may further provide the functionality to create the KPI metric test data values on one or more virtual machines supporting a CS manager 102 (e.g., VCE Vision). The collection of programs supporting the KPI generation manager 104 and/or KPI generation engine 106 may be executed individually or as part of a Web application container (e.g., Tomcat). Alternatively, CS manager 102 may be implemented using or located in an AMP and/or another device in physical infrastructure 118. In yet another example, virtualization software and/or virtualized components may be implemented using an AMP and/or another compute device (e.g., a blade appliance designated for some system management software).

It should be further noted that system manager 102, KPI generation manager 104, KPI generation engine 106, and/or functionality described herein may constitute a special purpose KPI generation system. Further, system manager 102, KPI generation manager 104, KPI generation engine 106, and/or functionality described herein can improve computer functionality and/or the technological field of computer related KPI data value generation by utilizing KPI parameter input and/or other mechanisms for utilizing the KPI metric test data values to subject an interface layer and/or service logic of the computing system to a validation assessment in CS 100 and/or other systems.

It will be appreciated that FIG. 1 is for illustrative purposes and that various components, their locations, and/or their functions as described above in relation to FIG. 1 may be changed, altered, added, or removed. Further, aspects of the disclosed subject matter (e.g., KPI generation manager 104 or KPI generation engine 106) may be implemented and/or located on any computing system or components therein.

Figure 2:
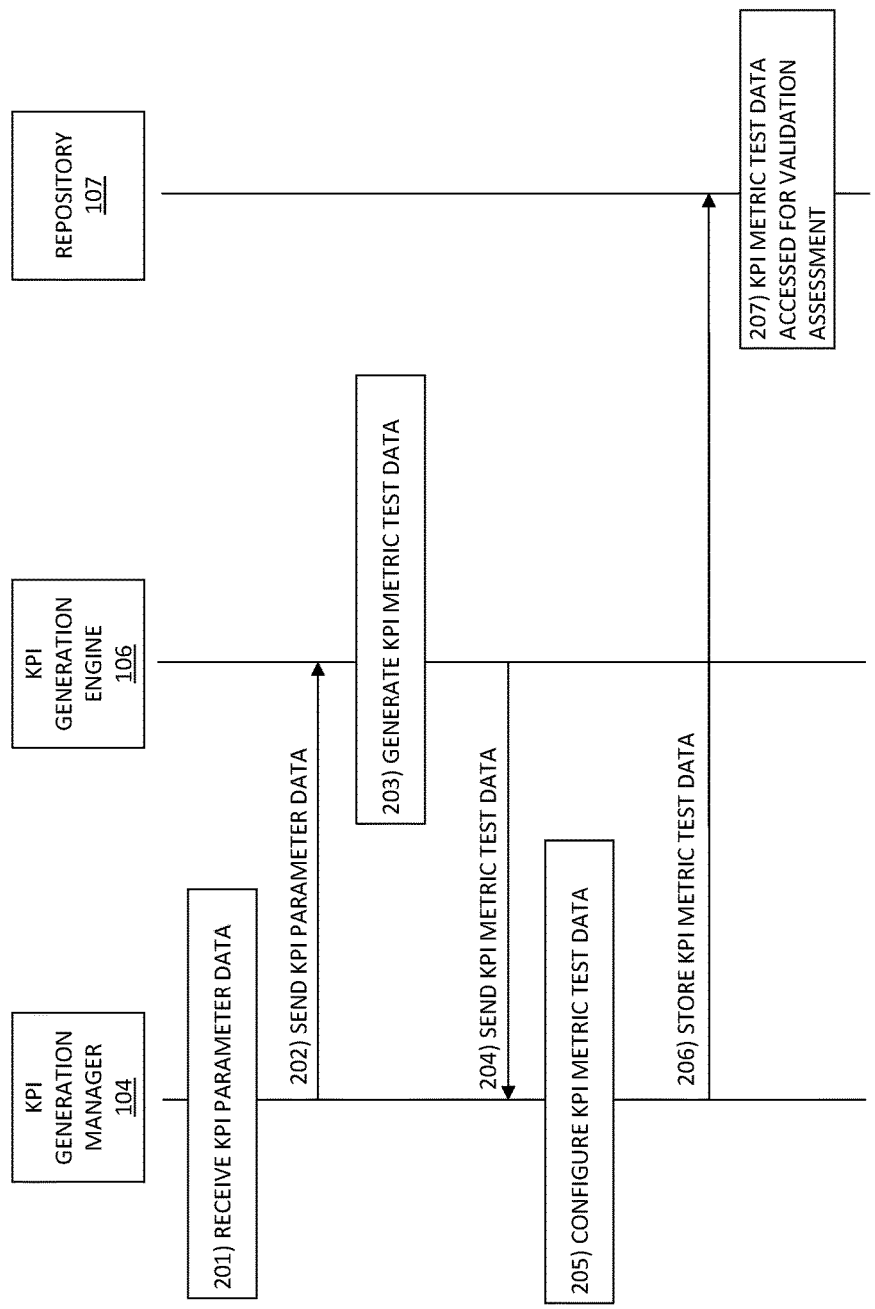
FIG. 2 is a block diagram illustrating an exemplary communications within a computing system associated with generating KPI metric test data in accordance with embodiments of the subject matter disclosed herein.

FIG. 2 is a block diagram illustrating an exemplary communications within a computing system associated with generating KPI metric test data in accordance with embodiments of the subject matter disclosed herein. In some embodiments, KPI generation manager 104 may receive KPI parameter data as input from a user via a client entity (e.g., step 201). For example, the KPI parameter data that a user may provide includes the name of the KPI itself (e.g., a KPI key) as well as any parameters that uniquely identify the computing system component or equipment that the KPI is supposed to have originated from. Such identifiers may include a globally unique identifier of a component device (e.g., a storage device, compute device, network switch, etc.), the hostname, and/or the IP address of the computing system containing the component device. The KPI parameter data may further include the frequency or interval with which to generate the KPI metric test data values. In some embodiments, a time period may be defined. For example, the start time of the time period over which the data should be generated and then and an end time period over which the data should be generated may be provided to define the time period. In addition to the KPI parameter data, KPI generation manager 104 may also receive a predefined KPI formula or algorithm for generating the KPI metric test data values. Alternatively, KPI generation manager 104 may receive a KPI seed file that may be used by manager 104 to generate a KPI formula.

After receiving the KPI parameter data and KPI formula, KPI generation manager 104 may be configured to send the KPI parameter data and KPI formula to KPI generation engine 106 (step 202). Upon receiving this data sent by KPI generation manager 104, KPI generation engine 106 may be configured to generate the corresponding KPI metric test data (step 203). For example, KPI generation engine 106 may utilize the KPI formula received from KPI generation manager 104 and KPI parameter data (e.g., start and end time, collection frequency, boundary limits, etc.) to generate the KPI metric test data values. In some examples, KPI generation engine 106 utilizes the KPI perimeter data as inputs to the KPI formula.

After generating the KPI metric test data values, KPI generation engine 106 sends the generated KPI metric test data to KPI generation manager 104 (step 204). In response, KPI generation manager 104 may configure the KPI metric test data (step 205). For example, KPI generation manager 104 may aggregate all of the KPI metric test data values received from KPI generation engine 106. Alternatively, KPI generation manager 104 may be configured to format the KPI metric test data such that the data is compatible with the interface layer that is subjected to the validation assessment by system manager 102. Once the KPI metric test data is configured and/or aggregated, KPI generation manager 104 sends the KPI metric data to repository 107 for storage and provides the address location information to system manager 102 for its subsequent access (step 206). As indicated above, repository 107 may include a data store or database that is accessible to system manager 102. More specifically, after being stored in repository 107, the KPI metric test data may be obtained by system manager 102 for validation assessment (e.g., a performance test) execution (step 207). For example, system manager 102 may utilize the KPI metric test data to execute a performance test for a system interface or service that is configured to handle and process KPI metric data. In some embodiments, KPI metric test data may be used by system manager 102 to test a presentation layer or messaging layer of system 100. As an example, the KPI metric test data may be used to test the display capabilities of a client device's GUI (e.g., the presentation layer). Similarly, the KPI metric test data may be utilized to test the APIs utilized by system 100 at the messaging layer. As indicated above, both of these validation assessments may be conducted without actually collecting actual KPI metric data from components of the computing system 100.

Figure 3:
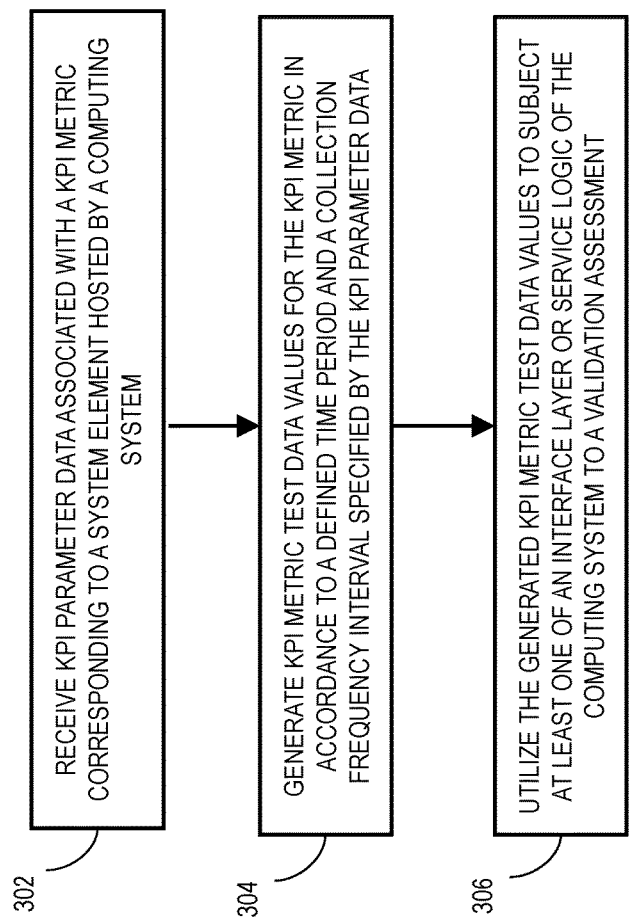
FIG. 3 illustrates a flow chart of an exemplary method for generating KPI metric test data in accordance with embodiments of the subject matter disclosed herein.

FIG. 3 is a flow chart illustrating an exemplary method for generating KPI metric test data, in accordance with aspects of the subject matter described herein. As shown in FIG. 3, at step 302, KPI parameter data associated with a KPI metric corresponding to a system element hosted by a computing system is received. In some examples, a KPI generation manager receives KPI parameter data from a user.

At step 304, KPI metric test data values for the KPI metric is generated in accordance to a defined time period and a collection frequency interval specified by the KPI parameter data. In some examples, the KPI parameter data and a KPI formula is communicated to a KPI generation engine from the KPI generation manager. Upon receiving this information from the KPI generation manager, the KPI generation engine is configured to execute the KPI formula using values, such as the defined time period and collection frequency interval, included the KPI parameter data as input.

At step 306, the generated KPI metric test data values are utilized to subject at least one of an interface layer or service logic of the computing system to a validation assessment. In some examples, the KPI generation manager receives the KPI metric test data values from the KPI generation engine. In response, the KPI generation manager may configure the KPI metric test data for validation assessment purposes (e.g., executing a performance test on an interface layer or validating service logic of the system). The KPI generation manager may subsequently store the KPI metric test data in a database that is accessible by the system manager of the host computing system. Notably, the KPI generation manager provides location information associated with the storing of the KPI metric test data to the system manager. The system manager may subsequently utilize the location information to access the KPI metric test data for conducting validation assessments, such as performance tests of one or more interface layers of the computing system.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
   receiving key performance indicator (KPI) parameter data associated with a KPI metric corresponding to a system element hosted by a computing system;
   generating KPI metric test data values for the KPI metric in accordance to a defined time period and a collection frequency interval specified by the KPI parameter data, wherein generating KPI metric test data values includes receiving a KPI seed file including model KPI metric test data values, generating a KPI formula based on the model KPI metric test data values, and executing the KPI formula to produce the KPI metric test data values; and utilizing the KPI metric test data values to subject at least one of an interface layer or service logic of the computing system to a validation assessment, wherein the validation assessment is conducted without collecting actual KPI metric data from system components of the computing system.

2. The method of claim 1 wherein the interface layer includes either an application programming interface (API) and a graphical user interface (GUI) of the computing system.

3. The method of claim 1 wherein the service logic includes aggregation logic.

4. The method of claim 1 wherein the KPI parameter data further includes information including at least one of a starting time of the defined time period, an ending time of the defined time period, a minimum KPI metric test data value, and a maximum KPI metric test data value.

5. The method of claim 1 wherein the system element includes either a component device or a virtual machine hosted by the computing system.

6. The method of claim 1 wherein the KPI metric test data values are generated utilizing a predefined KPI formula.

7. A system comprising:
a processor; and
a system manager including a KPI generation engine that when executed by the processor is configured for receiving, from a KPI generation manager, key performance indicator (KPI) parameter data associated with a KPI metric corresponding to a system element hosted by a computing system and for generating KPI metric test data values for the KPI metric in accordance to a defined time period and a collection frequency interval specified by the KPI parameter data, wherein generating KPI metric test data values includes receiving a KPI seed file including model KPI metric test data values, generating a KPI formula based on the model KPI metric test data values, and executing the KPI formula to produce the KPI metric test data values, wherein the system manager is configured for utilizing the KPI metric test data values to subject at least one of an interface layer or service logic of the computing system to a validation assessment, wherein the validation assessment is conducted without collecting actual KPI metric data from system components of the computing system.

8. The system of claim 7 wherein the interface layer includes either an application programming interface (API) and a graphical user interface (GUI) of the computing system.

9. The system of claim 7 wherein the service logic includes aggregation logic.

10. The system of claim 7 wherein the KPI parameter data further includes information including at least one of a starting time of the defined time period, an ending time of the defined time period, a minimum KPI metric test data value, and a maximum KPI metric test data value.

11. The system of claim 7 wherein the system element includes either a component device or a virtual machine hosted by the computing system.

12. The system of claim 7 wherein the KPI metric test data values are generated utilizing a predefined KPI formula.

13. A non-transitory computer readable medium having stored thereon executable instructions that when executed by a processor of a computer control the computer to perform steps comprising:

receiving key performance indicator (KPI) parameter data associated with a KPI metric corresponding to a system element hosted by a computing system;

generating KPI metric test data values for the KPI metric in accordance to a defined time period and a collection frequency interval specified by the KPI parameter data, wherein generating KPI metric test data values includes receiving a KPI seed file including model KPI metric test data values, generating a KPI formula based on the model KPI metric test data values, and executing the KPI formula to produce the KPI metric test data values; and utilizing the KPI metric test data values to subject at least one of an interface layer or service logic of the computing system to a validation assessment, wherein the validation assessment is conducted without collecting actual KPI metric data from system components of the computing system.

14. The non-transitory computer readable medium of claim 13 wherein the interface layer includes either an application programming interface (API) and a graphical user interface (GUI) of the computing system.

15. The non-transitory computer readable medium of claim 13 wherein the service logic includes aggregation logic.

16. The non-transitory computer readable medium of claim 13 wherein the KPI parameter data further includes information including at least one of a starting time of the defined time period, an ending time of the defined time period, a minimum KPI metric test data value, and a maximum KPI metric test data value.

17. The non-transitory computer readable medium of claim 13 wherein the system element includes either a component device or a virtual machine hosted by the computing system.

18. The non-transitory computer readable medium of claim 13 wherein the KPI metric test data values are generated utilizing a predefined KPI formula or KPI formula generated by a KPI seed file.

* * * * *